US005680163A

United States Patent [19]

Sugahara

[11] Patent Number: 5,680,163

[45] Date of Patent: Oct. 21, 1997

[54] LINK MEMBER AND ELECTRODE STRUCTURE FOR AN INK EJECTING DEVICE

[75] Inventor: Hiroto Sugahara, Aichi-ken, Japan

[73] Assignee: Brother Kogyo Kabushiki Kaisha, Nagoya, Japan

[21] Appl. No.: 534,850

[22] Filed: Sep. 27, 1995

[30] Foreign Application Priority Data

Jan. 30, 1995 [JP] Japan .................................... 7-012435

[51] Int. Cl.[6] .................................................... B01D 15/16

[52] U.S. Cl. .................................. 347/71; 347/68; 347/94

[58] Field of Search .................................. 347/68, 71, 94

[56] References Cited

U.S. PATENT DOCUMENTS 3,946,398 3/1976 Kyser et al. .
4,723,129 2/1988 Endo et al. .
4,752,788 6/1988 Yasuhara et al. .................... 346/140 R
4,879,568 11/1989 Bartky et al. .
4,887,100 12/1989 Michaelis et al. .
4,992,808 2/1991 Bartky et al. .
5,003,679 4/1991 Bartky et al. .
5,028,936 7/1991 Bartky et al. .
5,406,315 4/1995 Allen etal. .................................. 347/7

*Primary Examiner*—Daniel P. Malley
*Attorney, Agent, or Firm*—Oliff & Berridge

[57] ABSTRACT

A piezoelectric ceramic plate has a plurality of grooves and partition walls formed in it. A cover plate is attached to the piezoelectric ceramic plate to cover the grooves to form interleaved ink channels and air channels. A flexible print board is adhesively attached to one end surface each of the piezoelectric ceramic plate and the cover plate. The ink supply ports formed in the flexible print board connect to the ink channels. A cover portion formed on the flexible print board covers the inlet ports of the air channels so that no ink enters the air channels. A first contact electrode formed on the flexible print board is electrically connected to metal electrodes in the ink channels. A second contact electrode is electrically connected to metal electrodes in the air channels.

25 Claims, 11 Drawing Sheets

LINK MEMBER AND ELECTRODE STRUCTURE FOR AN INK EJECTING DEVICE

BACKGROUND OF THE INVENTION

1. Field of the Invention

This invention generally relates to an ink ejecting device. In particular, this invention relates to a connection structure for connecting electrodes of the ink ejecting device to a control device and for connecting the ink ejecting device to an ink supply manifold.

2. Description of the Related Art

Known drop-on-demand type ink ejecting devices include a Kyser type ink ejecting device, disclosed in U.S. Pat. No. 3,946,398, and a thermal ink ejection type ink ejecting device, disclosed in U.S. Pat. No. 4,723,129. The Kyser type ink ejecting device is difficult to design using a compact size. The thermal ink ejection type ink ejecting device requires the ink to have a heat-tolerant property because the ink is heated at a high temperature. Accordingly, these devices have significant problems.

A shear mode type ink ejecting device, as disclosed in U.S. Pat. No. 4,879,568, has been proposed as a new type of ink ejecting device which can simultaneously solve the above disadvantages.

As shown in FIGS. 19A and 19B, the shear mode type ink ejecting device 600 comprises a bottom wall 601, a top 602 and a plurality of shear mode actuator walls 603 extending between the top and bottom walls 602 and 601. Each of the actuator walls 603 comprises a lower wall portion 607 and an upper wall portion 605. The lower wall portion 607 is adhesively attached to the bottom wall 601 and polarized in a direction indicated by an arrow 611. The upper wall portion 605 is adhesively attached to the top wall 602 and polarized in a direction indicated by an arrow 609. Each pair of adjacent actuator walls 603 forms either an ink channel 613 between them, or a space channel 615 between them. The space channels 615 are narrower than the ink channels 613 and are adjacent to the ink channels 613. The space channels 615 are formed in an alternate relationship with the ink channels 613.

A nozzle plate 617 having a plurality of nozzles 618 formed in it is fixedly secured to the top and bottom walls 602 and 601 so that one end of each ink channel 613 connects to a corresponding one of the nozzles 618. The electrodes 619 and 621 are provided as metallized layers on both side surfaces of each actuator wall 603. Each of the electrodes 619 and 621 is covered by an insulating layer (not shown) to insulate the electrode 619 or 621 from ink. The electrodes 619 and 621 which face the space channel 615 are connected to the ground 623. The electrodes 619 and 621 which are provided in the ink channels 613 are connected to a silicon chip 625, which forms an actuator driving circuit.

In a manufacturing method for the ink ejecting device 600, as described above, a first piezoelectric ceramic layer is adhesively attached to the bottom wall 601. The first piezoelectric ceramic layer is polarized in a direction indicated by an arrow 611. A second piezoelectric ceramic layer is adhesively attached to the top wall 602. The second piezoelectric ceramic layer is polarized in a direction indicated by an arrow 609. The thickness of each of the first and second piezoelectric ceramic layers is equal to the height of each of the lower wall portions 607 and the upper wall portions 605, respectively. Subsequently, a plurality of parallel grooves are formed in the first and second piezoelectric ceramic layers by a diamond cutting disc or the like to form the lower wall portions 607 and the upper wall portions 605. The electrodes 619 are formed on the side surfaces of the lower wall portions 607 by a vacuum-deposition method. The insulating layer, as described above, is provided onto the electrodes 619. Likewise, the electrodes 621 are provided on the side surfaces of the upper wall portions 605 and the insulating layer is further provided on the electrodes 621.

The free ends of the upper wall portions 605 and the lower wall portions 607 are adhesively attached to one another to form the ink channels 613 and the space channels 615. Subsequently, the nozzle plate 617 is adhesively attached to one end of the top and bottom walls 602 and 601 so that the nozzles 618 face the ink channels 613. The electrodes 619 and 621 at other ends of the ink channels 613 and the space channels 615 are connected to the silicon chip 625 and the ground 623.

A voltage is applied to the electrodes 619 and 621 of each ink channel 613 from the silicon chip 625. As a result, each actuator wall 603 suffers a piezoelectric shear mode deflection in a direction such that the volume of each ink channel 613 increases. The voltage is removed after a predetermined time elapses. Accordingly, the volume of each ink channel 613 returns from a volume-increased state to a natural state, so that the ink in each actuated ink channel 613 is pressurized and an ink droplet is ejected from the corresponding nozzle 618.

In U.S. Pat. No. 4,879,568, which discloses the ink ejecting device 600 as described above, the electrodes 619 and 621 which face the space channels 615 are connected to the ground 623. The electrodes 619 and 621 provided in the ink channels 613 are connected to the silicon chip 625. Furthermore, ink is generally supplied into the plurality of ink channels from an ink tank through manifold members which connect to the ink channels 613.

SUMMARY OF THE INVENTION

This invention provides an ink ejecting device in which electrical connection to the ink ejecting device can be easily performed and to which a manifold member can be joined with no leakage of ink.

This invention also provides an ink ejecting device which is capable of easily performing electrical connection, supplying ink into ink ejection channels and preventing ink from leaking into the ink non-ejection channels.

According to a first preferred embodiment of this invention, the ink ejecting device includes a plurality ink ejection channels which are supplied with ink from an ink supply source and from which the ink is ejected, a manifold member for supplying the ink from the ink supply source to each ink ejection channel, an ink ejection mechanism, electrodes which are electrically connected to the ink ejection mechanism and to which a voltage is applied from a power source circuit, a link member having connection portions for connecting the electrodes to the power source circuit, ink supply ports for connecting the ink ejection channels to the manifold member, and cover portions.

According to a second preferred embodiment of this invention, the ink ejecting device includes the plurality of ink ejection channels which are supplied with ink from the ink supply source and from which the ink is ejected, a plurality of ink non-ejection channels, each of which is provided at one side of an adjacent ink ejection channel and to which no ink is supplied, an ink ejection mechanism for ejecting ink from the ink ejection channels, electrodes which are electrically connected to the ink ejection mechanism and to which the voltage is applied from the power source circuit, and a link member having connection portions for electrically connecting the electrodes to the power source circuit, ink supply ports for connecting the ink ejection channels to the manifold member, and cover portions for preventing the ink non-ejection channels from becoming connected to the ink supply source.

In the ink ejecting device as outlined above, the connection portions of the link member electrically connect the electrodes to the power source circuit. The ink supply ports of the link member connect the ink ejection channels to the manifold. Furthermore, the cover portions of the link member prevent the ink from leaking from the manifold member. Thus, with the link member, the voltage is applied to the electrodes, the ink is supplied to the ink ejection channels, and the leaking of ink from the manifold member is prevented.

The cover portions of the link member also prevent the ink non-ejection channels from communicating with the ink supply source. Leakage of the ink into the ink non-ejection channels can thus be prevented.

Therefore, the construction of the ink ejecting device can be simplified and the manufacturing cost of the ink ejecting device can be reduced. In addition, electrical connection of the electrodes to the power source circuit can be easily performed, so that the ink ejecting device can be designed in a compact size and at a low price. Furthermore, the number of electrical connection points can be reduced to improve reliability of the ink ejecting device.

These and other features and advantages of the invention are described in or apparent from the following detailed description of the preferred embodiments.

BRIEF DESCRIPTION OF THE DRAWINGS

A preferred embodiment of this invention will be described in detail, with reference to the following figures, wherein.

DETAILED DESCRIPTION OF THE PREFERRED EMBODIMENTS

Figure 1:
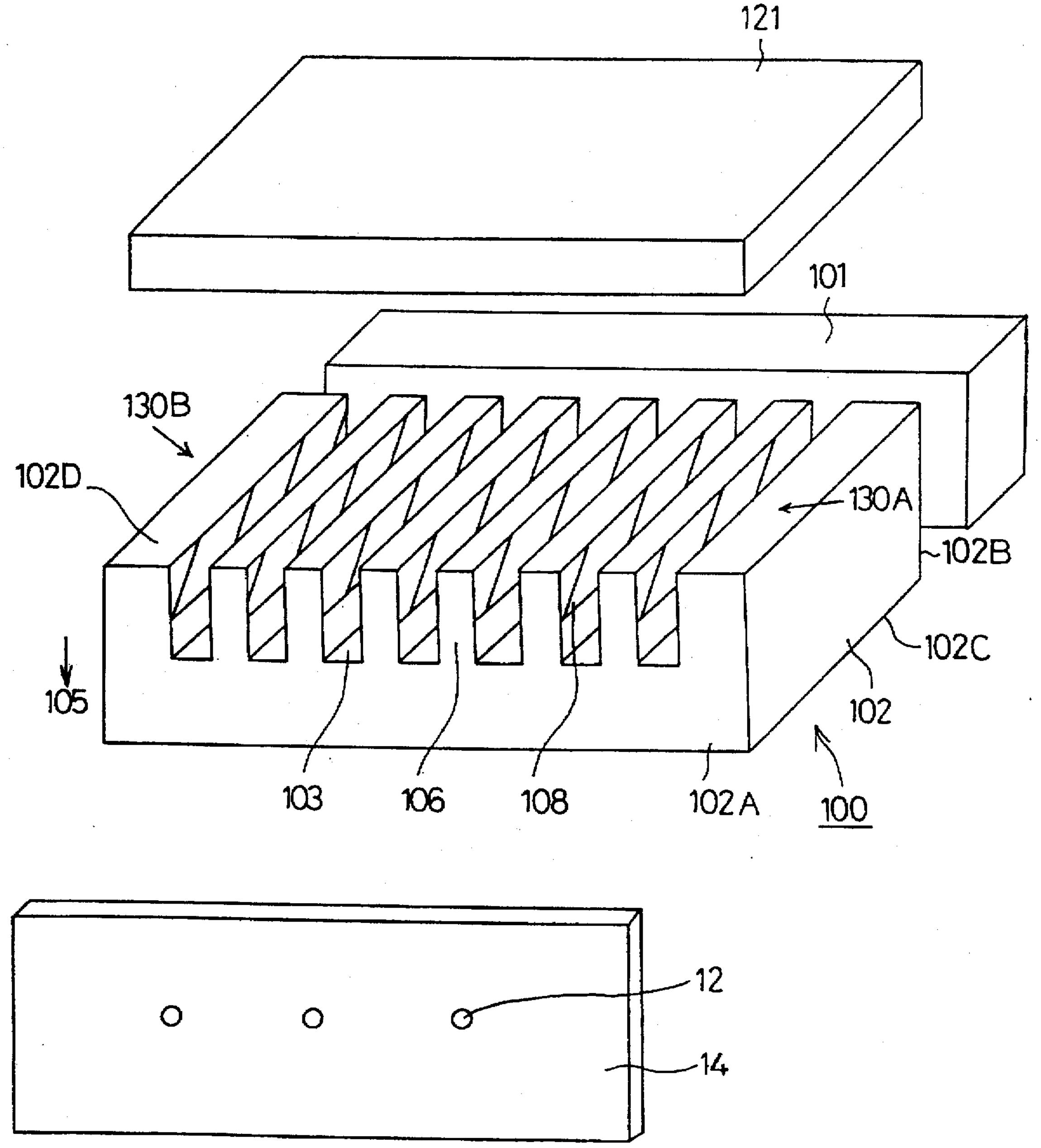
FIG. 1 is a perspective view showing an ink ejecting print head of a first preferred embodiment according to this invention.
Figure 2:
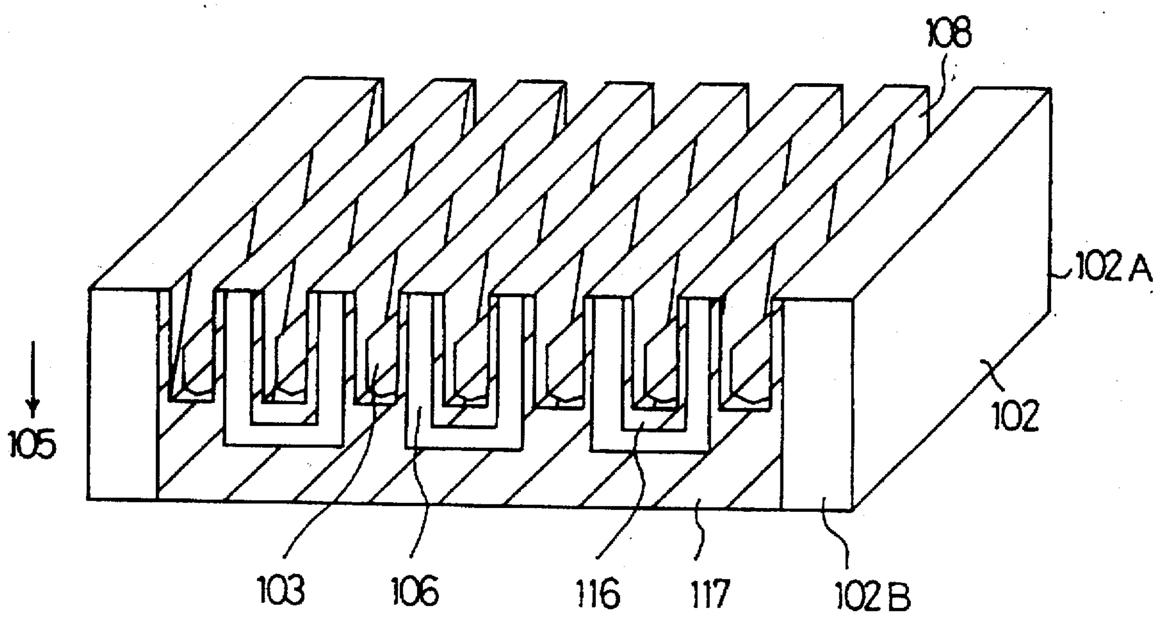
FIG. 2 is a perspective view showing a piezoelectric ceramic plate of the first preferred embodiment of the ink ejection print head.
Figure 3:
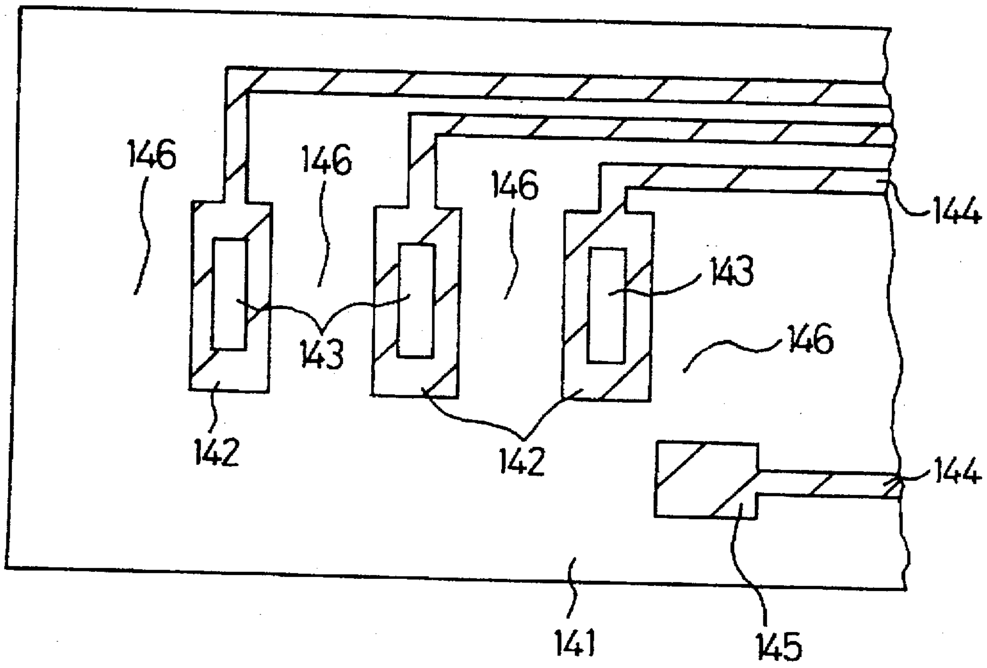
FIG. 3 is a plan view of a first preferred embodiment of a flexible print board of the first preferred embodiment of the ink ejection print head.
Figure 4:
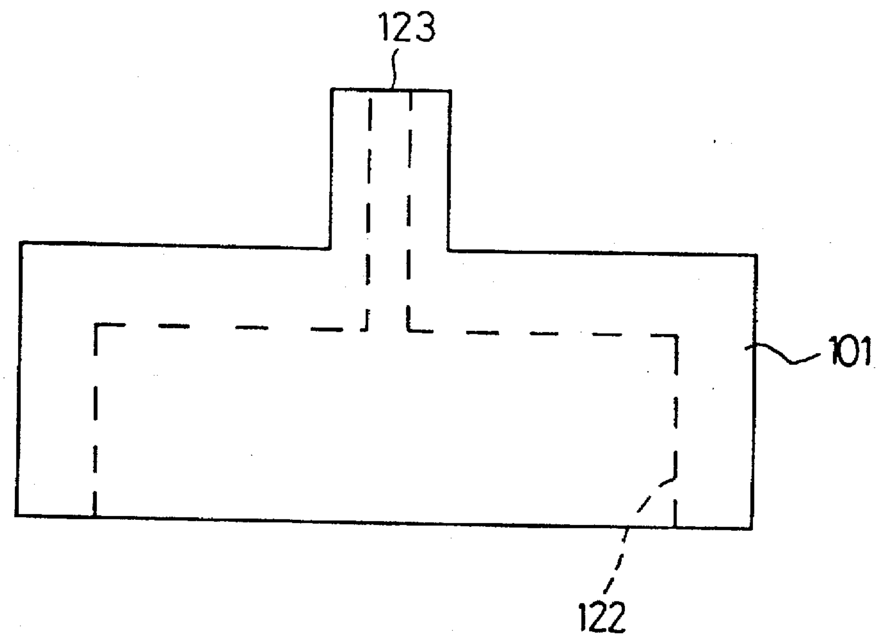
FIG. 4 is a plan view of a manifold member of the first preferred embodiment of the ink ejection print head.

As shown in FIGS. 1–4, an ink ejection print head 100 comprises a piezoelectric ceramic plate 102, a cover plate 121, a nozzle plate 14, a flexible print board 141, as shown in FIG. 3, and a manifold member 101. The piezoelectric ceramic plate 102 is formed of ceramic material, such as lead zirconate titanate (PZT) or the like. The piezoelectric ceramic plate 103 is machined with a diamond blade or the like to form a plurality of grooves 103 and a plurality of partition walls 106 in a top surface 102D of the piezoelectric ceramic plate 102. The partition walls 106 define the side surfaces of the grooves 103 and are polarized in a direction indicated by an arrow 105. The grooves 103 have the same depth and are parallel to one another. The grooves 103 also open at each end surface 102A and 102B of the piezoelectric ceramic plate 102.

Metal electrodes 108 are deposited from the directions indicated by arrows 130A and 130B and form driving electrode portions. The metal of the metal electrodes 108 is deposited from a deposition source (not shown), such as a sputtering source or the like. The deposition source is located above the top surface 102D and to one side of the end surface 102B of the piezoelectric ceramic plate 102. In this case, the top portions of the partition walls 106 are masked so that no metal electrode is formed on these portions. Accordingly, the metal electrodes 108 are formed only on the upper half areas of both side surfaces of the grooves 103 by a shadow effect of the partition walls 106. At this time, as shown in FIG. 2, metal electrodes 116 and 117 are formed on the end surface 102B as connection electrode portions which are electrically connected to the metal electrodes 108. The end surface 102B of the piezoelectric ceramic plate 102 is masked so that the metal electrodes 116 and 117 are separated from each other.

Figure 7:
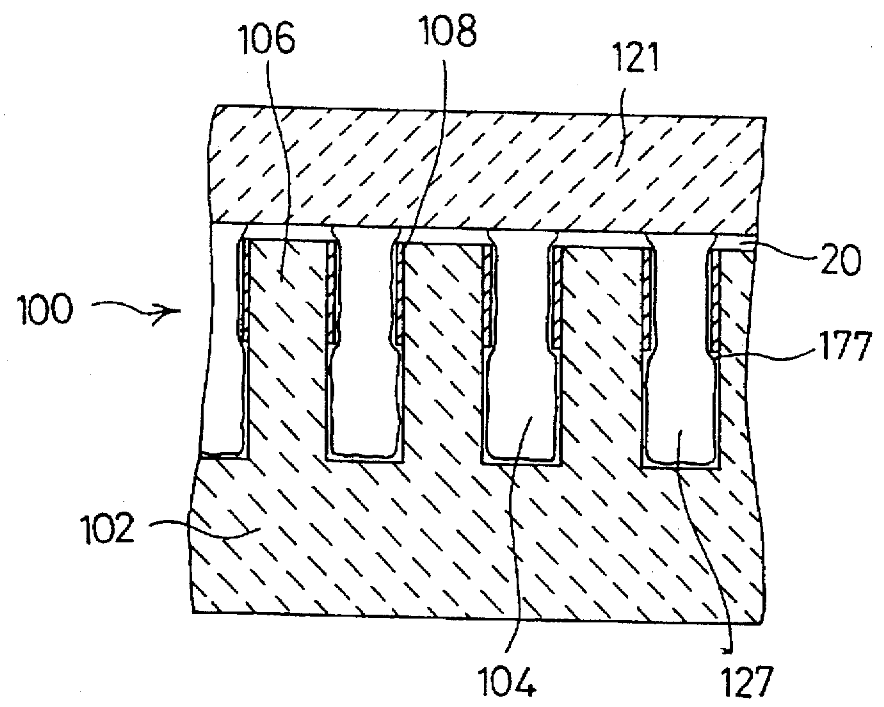
FIG. 7 is a cross-sectional view of the first preferred embodiment of the ink ejection print head.

Each of the metal electrodes 116 connects the metal electrodes 108 at both sides of each groove 103 which will be used as an ink channel 104, a shown in FIG. 7. The metal electrode 117 connects the metal electrodes 108 in all the grooves 103 which will be used as air channels 127, as shown in FIG. 7. Subsequently, the metal electrodes 108, 116 and 117 of the piezoelectric ceramic plate 102 are coated with an epoxy resin, which forms a protection film 177, as shown in FIG. 7.

The cover plate 121 is formed of alumina. The cover plate 121 is adhesively attached to the top surface 102D of the piezoelectric ceramic plate 102 by an epoxy adhesive 20, as shown in FIG. 7. Accordingly, in the ink ejection print head 100, the upper faces of the grooves 103 are covered to form the ink channels (or ink ejection channels) 104 having the metal electrodes 108 connected to the metal electrodes 116, and the air channels (or ink ejection channels) 127 having the metal electrodes 108 connected to the metal electrode 117. The ink channels 104 and the air channels 127 have a slender shape having a rectangular cross-section. All the ink channels 104 are filled with ink, while the air channels 127 are all filled with air.

The nozzle plate 14 has a plurality of nozzles 12, which are arranged to connect to corresponding ones of the ink channels 104. The nozzle plate 14 is adhesively attached to the end surface 102A of the piezoelectric ceramic plate 102 and the end surface of the cover plate 121. The nozzle plate 14 is formed of a plastic material such as polyalkylene (for example, polyethylene) terephthalate, polyimide, polyether imide, polyether ketone, polyether sulfone, polycarbonate, cellulose acetate or the like.

Figure 5:
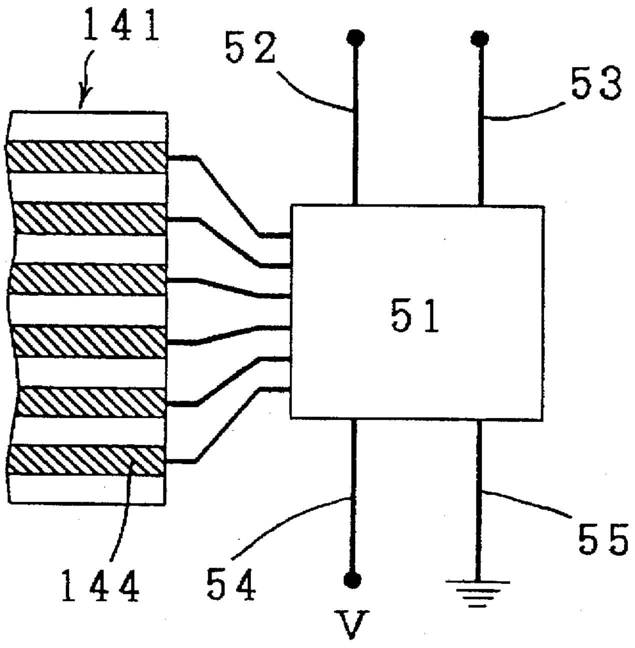
FIG. 5 is a block diagram of a controller of the first preferred embodiment of the ink ejection print head.

Subsequently, as shown in FIG. 3, the flexible print board 141 is adhesively attached to the end surface 102B of the piezoelectric ceramic plate 102 and the end surface of the cover plate 121. The flexible print board 141 is provided with contact electrodes 142 corresponding to the metal electrodes 116, ink supply ports 143 corresponding to the respective ink channels 104, a contact electrode 145 corresponding to the metal electrode 117, cover portions 146 for covering, or closing, the air channels 127 and connection patterns 144 for connecting the contact electrodes 142 and 145 to an LSI chip 51, as shown in FIG. 5. Optionally, each cover portion 146 can be glued to the metal electrode 117 of the air channels with an epoxy-based adhesive or with an adhesive hardened by irradiation with ultraviolet radiation. This will even more securely attach the flexible print board 141 to the piezoelectric ceramic plate 102 and/or the cover plate 121.

Each ink supply port 143 is formed such that the sectional shape of the ink supply port 143 is fixed or tapered in a thickness direction of the flexible print board 141. When the ink supply ports 143 have a tapered shape, the broader opening end of the ink supply ports 143 is at the manifold side and the narrower opening end is at the ink channel side. Thus, when the pressure in the ink channel is increased due to deformation of the partition walls during the operation of the ink ejection print head 100, as described later, leakage of ink from the ink supply port due to the pressure prevented.

When the flexible print board 141 is adhesively attached to the piezoelectric ceramic plate 102 and the cover plate 103, each ink supply port 143 is connected to a corresponding ink channel 104 and the contact electrodes 142 are electrically connected to the metal electrodes 116. At the same time, the cover portions 146 close the air channels 127 and the contact electrode 145 is electrically connected to the metal electrode 117.

Subsequently, the manifold member 101 is adhesively attached by the flexible print board 141 to the end surface 102B of the piezoelectric ceramic plate 102. The manifold member 101 has a manifold 122 and a supply port 123. The manifold 122 has a shape corresponding to the shape of the ink supply ports 143. The supply port 123 is connected to an ink tank (not shown). The ink tank thus communicates with the ink channels 104 through the supply port 123, the manifold 122 and the ink supply ports 143. However, the ink supply ports 143 are prevented from communicating with the air channels 127 by the cover portions 146.

As shown in FIG. 5, the metal electrodes 116 and 117 which are formed on the end surface 102B of the piezoelectric ceramic plate 102 are connected to the LSI chip 51 of the power source circuit through the contact electrodes 142 and 145 and the connection patterns 144 on the flexible print board 141.

Each of the contact electrodes 142 and 145 provided on the flexible print board 141 is individually connected to the LSI chip 51 through one of the connection patterns 144. Each of a clock line 52, a data line 53, a voltage line 54 and a ground line 55 is also connected to the LSI chip 51. On the basis of sequential clock pulses supplied from the clock line 52 and from data appearing on the data line 53, the LSI chip 51 determines through which of the nozzles 12 ink droplets should be ejected. The LSI chip 51 then applies a voltage V, supplied on the voltage line 54, to the connection patterns 144 connected to the metal electrodes 108 in the ink channels 104 from which the ink is to be ejected. Furthermore, the LSI chip 51 connects the ground line 55 to the connection patterns 144 connected to the metal electrodes 108 of the other ink channels 104 from which no ink is to be ejected and to the metal electrodes 108 of the air channels 127.

Figure 8:
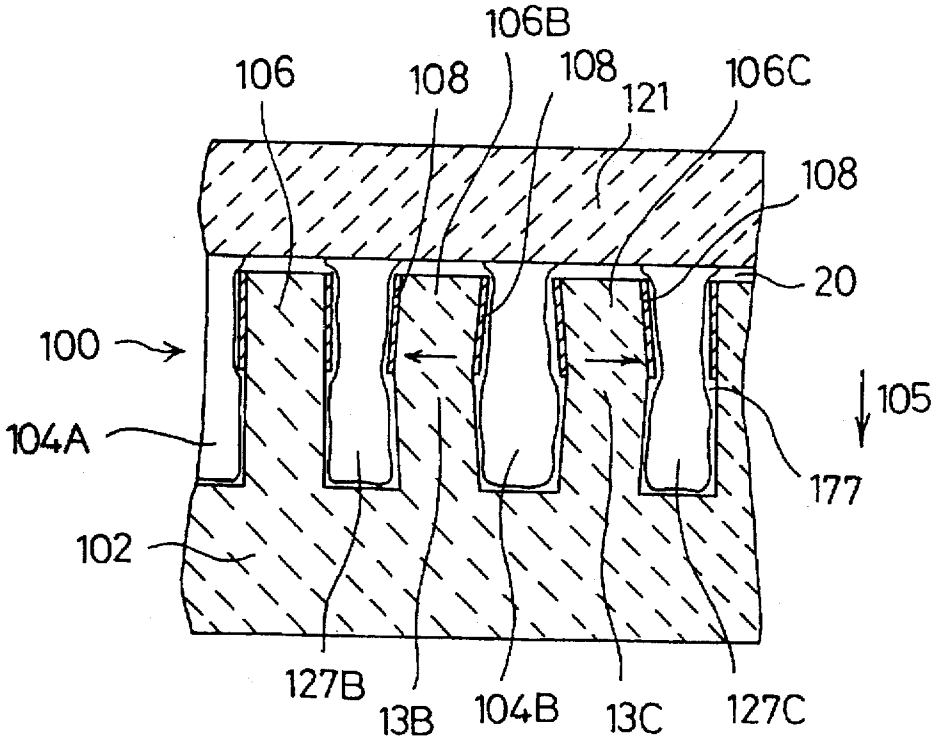
FIG. 8 is a cross-sectional view of the first preferred embodiment of the ink ejection print head in operation.

For example, when the LSI chip 51 determines that an ink droplet is to be ejected from an ink channel 104B, as shown in FIG. 8, the LSI chip 51 applies the voltage V from the voltage line 54 to the connection pattern 144 which is connected to the metal electrodes 108 in the ink channel 104B. The LSI chip 51 also connects the ground line 55 to the connection patterns 144 which are connected to the metal electrodes 108 of the other ink channels 104 through which no ink is to be ejected and the metal electrodes 108 of the air channels 127. That is, the metal electrodes 108 of the ink channels 104B are supplied with the voltage V, and the metal electrodes 108 of the other ink channels 104 and the air channels 127 are grounded.

When the voltage is applied to the ink ejection print head 100 as described above, an electric field in a direction indicated by an arrow 13B is generated in a partition wall 106B, while an electric field in a direction indicated by an arrow 13C is generated in a partition wall 106C. Therefore, the partition walls 106B and 106C move away from each other. The volume of the ink channel 104B increases due to deformation of the partition walls 106B and 106C. Thus, the pressure in the ink channel 104B near the peripheral portion of the nozzle 12 is reduced.

This pressure-reduced state is kept for a time period represented by L/a. During this time period, the ink is supplied from the manifold 122 through the corresponding ink supply port 143 into the ink channel 104B. The time period of L/a is a time which is required for the pressure wave in the ink channel 104B to propagate one way in the longitudinal direction of the ink channel 104B, from the ink supply port 143 to the nozzle plate 14 or in the opposite direction. The time period of L/a is determined from the length L of the ink channel 104 and the sound velocity a of the ink.

According to the propagation theory of a pressure wave, after the time period of L/a elapses from the increase in the volume in the ink channel 104B and the pressure in the ink channel 104B drops, the pressure in the ink channel 104B is inverted and thus changes to a positive pressure. At this time, the voltage V applied to the metal electrodes 108 of the ink channel 104B is returned to 0V. As a result, the partition walls 106B and 106C return to a rest, or pre-deformation, state, as shown in FIG. 7. Therefore, the ink in the ink channel 104B is pressurized. Then the positive pressure wave is added to the pressure which occurs when the partition walls 106B and 106C return to the rest state. Thus, relatively high pressure is applied to the ink in the ink channel 104B, so that an ink droplet is ejected from the corresponding nozzle 12.

Figure 6:
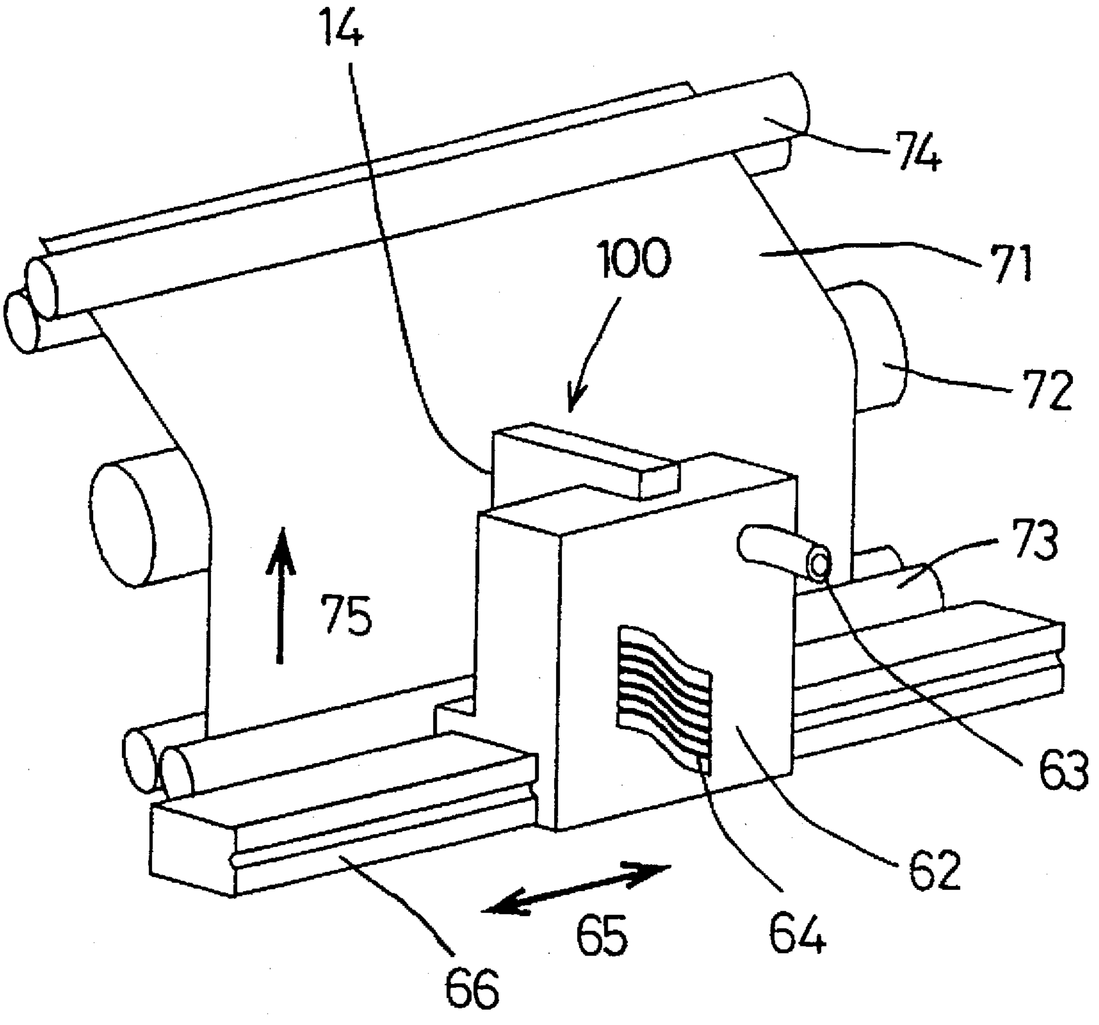
FIG. 6 is a perspective view of a printer incorporating the first preferred embodiment of the ink ejection print head.

A printer incorporating the ink ejection print head 100 is shown in FIG. 6. The ink ejection print head 100 is attached to a carriage 62. The supply port 123, shown in FIG. 4, and an ink tank are connected by an ink supply tube 63. The LSI chip 51 shown in FIG. 5 is incorporated into the carriage 62. A flexible cable 64 includes the clock line 52, the data line 53, the voltage line 54 and the ground line 55 and connects these lines between the LSI chip 51 and the other hardware (not shown) of the printer. A recording sheet is placed on a platen roller 72. The carriage 62 is reciprocatively movable along a slider 66 over the whole width of the recording sheet 71 in a direction indicated by an arrow 65. Ink droplets are ejected from the nozzles 12, shown in FIG. 1, provided in the nozzle plate 14 onto the recording sheet 71.

The recording sheet is fed in a direction indicated by an arrow 75 by sheet feeding rollers 73 and 74 every time the carriage 62 reaches one end of the slider 66. In general, the recording sheet 71 does not move while the ink ejection print head 100 ejects the ink droplets. Accordingly, desired characters or images can be formed on the whole surface of the recording sheet 71.

As described above, according to this first preferred embodiment of the ink ejection print head 100, the metal electrodes 108 of the ink channels 104 and the air channels 127 are electrically connected to the contact electrodes 142 and the contact electrode 145 on the flexible print board 141 through the metal electrodes 116 and the metal electrode 117 which are formed on the end surface 102B of the piezoelectric ceramic plate 102. The ink channels 104 are connected to the ink tank through the ink supply ports 143 of the flexible print board 141. The air channels 127 are closed by the covering portion 146 on the flexible print board 141 so that no ink leaks into the air channels 127 occur.

Therefore, the link member for electrically connecting the ink ejection print head 100 and the LSI chip 51, and the member for supplying the ink to the ink channels 104 and preventing the ink from being supplied into the air channels 127 are not provided by different two members. Rather these members are formed by a single link member. That is, the functions of the two members of the conventional device are provided by the flexible print board 141. Accordingly, the construction of the printer is simplified, and the manufacturing costs are reduced. In addition, the ink ejection print head 100 can be designed in a compact size.

Furthermore, since the metal electrodes 108 in all of the air channels 127 are electrically connected to one another through the metal electrode 117, the number of contact points with the flexible print board 141 is reduced, and the connection operation is facilitated.

In this first preferred embodiment of the ink ejection print head 100, the metal electrodes 108 are electrically connected to the contact electrodes 142 and 145 through the metal electrodes 116 and 117 which are formed on the end surface 102B of the piezoelectric ceramic plate 102. However, the metal electrodes 108 may be electrically connected to the contact electrodes 142 and 145 even when the metal electrodes 116 and 117 are not formed on the end surface 102B of the piezoelectric ceramic plate 102. This structure and method is shown in FIGS. 9 to 13.

Figure 9:
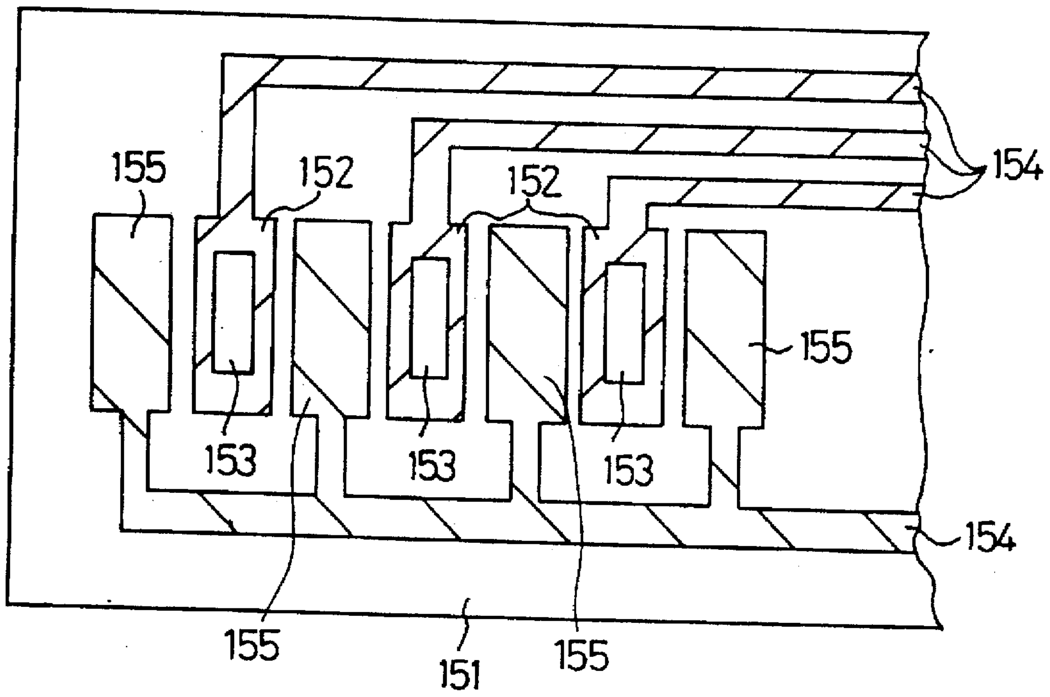
FIG. 9 is a plan view of a second preferred embodiment of the flexible print board of the first preferred embodiment of the ink ejection print head.

As shown in FIG. 9, a seal board 151, which is a second preferred embodiment of the flexible print board, includes a plurality of ink supply ports 153 corresponding to the ink channels 104, a plurality of contact electrodes 152 corresponding to the metal electrodes 108 in the ink channels 104, a plurality contact electrodes 155 corresponding to the metal electrodes 108 in the air channels 127, and a plurality of connection patterns 154 for connecting the contact electrodes 152 and 155 to the LSI chip 51. The opening portions of the air channels 127 on the end surface 102B are closed by those areas of the seal board 151 on which the contact electrodes 155 are formed.

Figure 10:
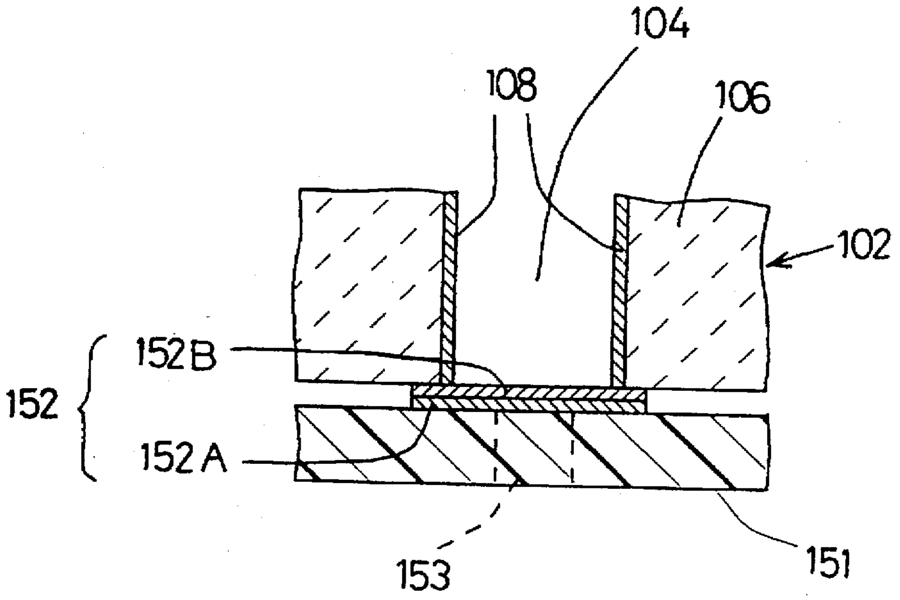
FIGS. 10 and 11 are cross-sectional views of a first preferred embodiment of the connection between the second preferred embodiment of the flexible print board and the piezoelectric plate of the first preferred embodiment of the ink ejection print head.

The contact electrodes 152 are formed as follows. First, a thin layer 152A, as shown in FIG. 10, is formed of a conductive material, such as nickel, aluminum, gold, carbon or the like, by sputtering, deposition, plating, screen printing, or the like. Then a thin layer 152B, as shown in FIG. 10, of alloy having a low melting point, such as a Pb-Sn alloy or the like, is formed on the thin layer 152A by sputtering, deposition, plating, screen printing, or the like. The contact electrodes 155 are formed in the same manner as the contact electrodes 152.

Figure 11:
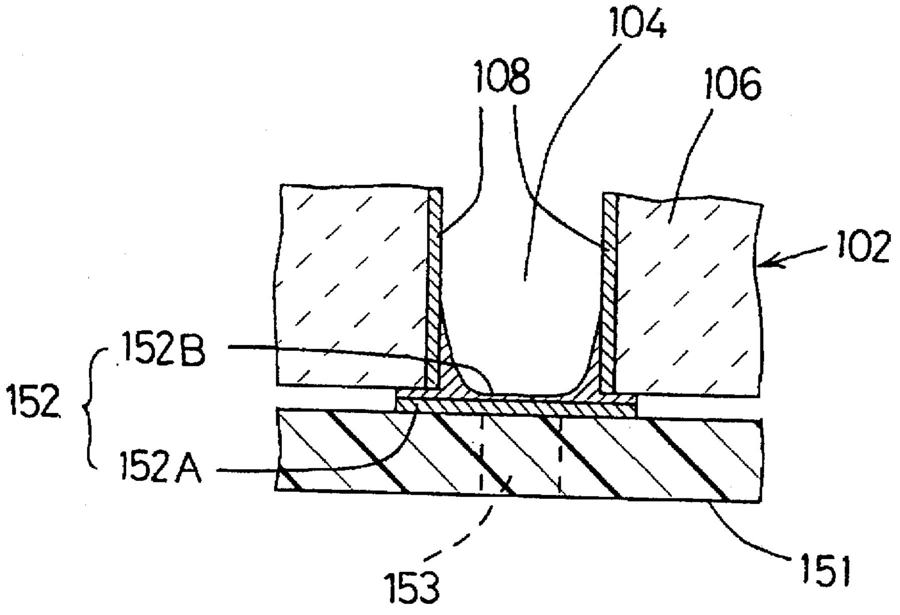

FIGS. 10 and 11 are cross-sectional views of a first preferred embodiment of the contact structure for electrically connecting the seal bond 151 to the piezoelectric ceramic plate 102, showing the peripheral portion of each contact electrode 152. The seal board 151 is disposed on the end surface 102B of the piezoelectric ceramic plate 102 and the end surface of the cover plate 103 so that the ink channels 104 face the corresponding ink supply ports 153. The metal electrodes 108 of the ink channels 104 face the contact electrodes 152, and the metal electrodes 108 of the air channels 127 face the contact electrodes 155. That is, the metal electrodes 108 in the ink channels 104 contact the thin layers 152B.

The seal board 151 and/or the piezoelectric ceramic plate 102 and the cover plate 103 are then heated to a temperature which is no less than the melting point of the thin layer 152B of the alloy having a low melting point and lower than the melting point of the thin layer 152A. Through this heating process, each thin layer 152B formed of the low melting point alloy is melted and extends over a part of the surface of each metal electrode 108, as shown in FIG. 11.

Subsequently, the heated seal bond 151 and/or the heated piezoelectric ceramic plate 102 and the cover plate 103 are cooled to room temperature. The thin layers 152B of the low melting point alloy solidify, so that the metal electrodes 108 and the thin layers 152A of conductive material are electrically and mechanically connected to one another through the thin layers 152B.

The heating temperature is set to about 200° C. when and alloy of 40%Pb and 60%Sn is used as the material for the low melting point thin layer 152B. Accordingly, the metal electrodes 108 in the ink channels 104 are connected to the LSI chip 51 through the contact electrodes 152 and the patterns 154. The contact electrodes 155 are also connected to the metal electrodes 108 in the air channels 127 in the same manner as described above.

If the seal board 151 is formed of alumina, silicon or the like, which is generally used for a hybrid IC board, a pattern can be freely formed in any shape on the seal board 151 by a well-known thick film forming technique. Accordingly, a soldering electrode can be provided at one end of each pattern 154. In this case, a surface treatment is performed and the flexible board or the like is connected to the patterns 154 by soldering to electrically connect the patterns to the LSI chip 51.

Furthermore, the patterns 154 extend to a portion adjacent to the end surface of the seal board 151. The contact terminals through which the patterns will be electrically connected to the LSI chip 51 are then soldered to the patterns 154. Still furthermore, by providing contact electrodes (not shown) on the patterns 154, the electrical connection to the LSI chip 51 can be realized through contact only. Also, a soldering pad (not shown) may be provided on the patterns 154 and a surface mount connector may be soldered to the pad. In addition, the LSI chip 51 may be mounted directly onto the seal board 151 to form a hybrid IC.

Figure 12:
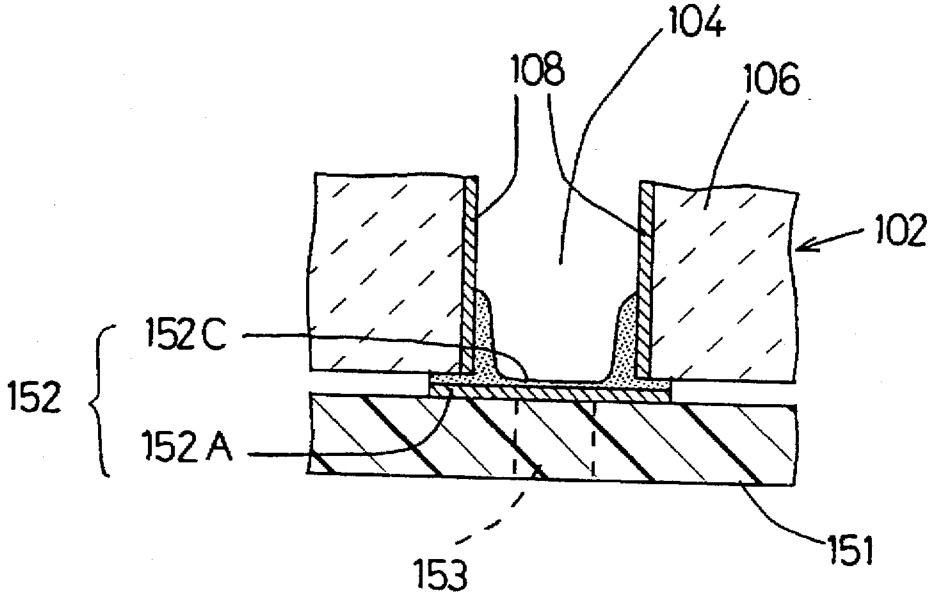
FIG. 12 is a second preferred embodiment of the connection between the second preferred embodiment of the flexible print board and the piezoelectric ceramic plate of the first preferred embodiment of the ink ejection print head.

FIG. 12 shows a second preferred embodiment of the contact structure for electrically connecting the seal board 151 to the piezoelectric ceramic plate 102. As shown in FIG. 12, in place of the thin layer 152B of the low melting point alloy, a conductive adhesive thin layer 152C may be formed on the conductive thin layer 152A by screen printing. The conduct adhesive thin layer 152C is, for example, a thin layer formed of a mixture of epoxy-based adhesive and a metal powder. In this case, when the metal electrodes 108 in the ink channels 104 and the thin layer 152C are brought into contact with each other, a part of the conductive adhesive thin layer 152C flows onto the metal electrodes 108.

In this case, when the seal board 151 and/or the piezoelectric ceramic plate 102 and the cover plate 103 is heated to a temperature at which the conductive adhesive thin layer 152C hardens, the metal electrodes 108 and the conductive thin layers 152 are electrically and mechanically coupled to one another. The heating temperature is set to about 150° C. for an epoxy adhesive. In this case, materials that harden when they are left at room temperature, irradiated with ultraviolet radiation or other types of radiation, or pressurized may be used as the conductive adhesive thin layer 152C.

Figure 13:
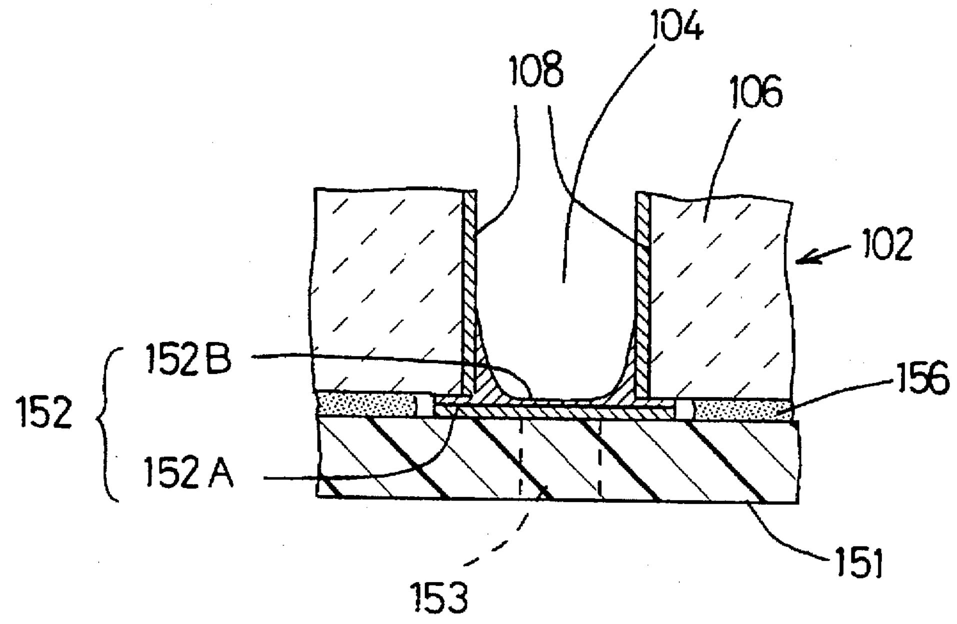
FIG. 13 is a third preferred embodiment of the connection between the second preferred embodiment of the flexible print board and the piezoelectric ceramic plate of the first preferred embodiment of the ink ejection print head.

FIG. 13 shows a third preferred embodiment of the contact structure for electrically connecting the seal board 151 to the piezoelectric ceramic plate 102. As shown in FIG. 13, an adhesive 156 is coated on an area of the seal board 151 on which the contact electrodes 152 and 155 are not formed. The adhesive 156 is hardened at the same time as the thin layer 152B of the low melting point alloy is melted and solidified, thereby joining the piezoelectric ceramic plate 102 and the cover plate 103 to the seal board 151. In this third preferred embodiment of the contact structure, either the thin layer 152B of the low melting point alloy or the thin layer 152C of conductive adhesive may be used. Materials which harden when left at room temperature, irradiated with ultraviolet radiation or the like, or pressurized may be used as the adhesive 156.

In the first preferred embodiment of the flexible print head 100, the metal electrodes 116 and the metal electrode 117 which are respectively connected to the metal electrodes 108 in the ink channels 104 and the air channels 127 are provided on the end surface 102B at one side of the piezoelectric ceramic plate 102. However, these electrodes may be separately provided on each end side of the piezoelectric ceramic plate 102. For example, the metal electrodes 116 which are connected to the metal electrodes 108 in the ink channels 104 are provided on the end surface 102B at one side of the piezoelectric ceramic plate 102. The metal electrodes 117 which are connected to the metal electrodes 108 in the air channels 127 are provided on the other end surface 102A of the piezoelectric ceramic plate 102.

In this case, two flexible boards are provided. One of the flexible boards is provided with contact electrodes and ink supply ports so that the contact electrodes face the metal electrodes on the end surface 102B and the ink supply ports face the ink channels 104. The other of the flexible boards is provided with contact electrodes and nozzles so that the contact electrodes face the metal electrodes on the other end surface 102A and the nozzles face the ink channels 104. Furthermore, in these preferred embodiment, three nozzles 12 are known for ejecting the ink droplets. However, any number of the nozzles 12, such as 50 or 200, may be provided. That is, the number of the nozzles 12 is not limited.

In these preferred embodiments, the volume of the ink channel 104B is increased when the voltage V is applied. Then, the driving voltage is removed to reduce the volume of the ink channel 104B to its natural state, thereby ejecting the ink droplet from the ink channel 104B. In place of this ink ejection operation, the volume of the ink channel 104B is first reduced to eject the ink droplet from the ink channel 104B. Then, the driving voltage is removed to increase the volume of the ink channel 104B from the reduced state to the natural state, thereby supplying the ink into the ink channel 104B.

Furthermore, in these preferred embodiments, the metal electrodes 108 of the air channels 127 and the ink channels 104 through which no ink is ejected, the ink non-ejection channels, are grounded, and the voltage is applied to the metal electrodes 108 in the ink channels 104 through which the ink is ejected, the ink ejection channels. However, the construction of the LSI chip 51 may be altered to apply the voltage to the metal electrodes 108 in the air channels 127. The metal electrodes 108 in the ink non-ejection channels 104 are kept at a high impedance state. The metal electrodes 108 in the ink ejection channels 104 are grounded.

Accordingly, an electric field is generated only in the partition walls 106 on both sides of each ink ejection channel 104 to eject the ink from the ink ejection channels 104. No voltage is applied to the metal electrodes 108 in the ink channels 104, so that it is unnecessary to provide a protection film for protecting the metal electrodes 108 from the ink. Therefore, the manufacturing cost can be further reduced.

Furthermore, in these preferred embodiments, the partition walls 106 are formed of piezoelectric material having ferroelectricity. However, a half portion in the height direction of each partition wall 106 may be formed of a piezoelectric material having ferroelectricity. The other half portion is then formed of a non-piezoelectric material, such as alumina or the like. In this case, the metal electrode may be formed on the whole side surface of each partition wall.

Additionally, in these preferred embodiments, the partition walls 106 are formed of piezoelectric material having ferroelectricity, and the metal electrodes 108 are formed on the upper half areas of the partition walls 106. The lower half areas of the partition walls 106 are deformed by piezoelectric deformation of the upper half areas of the partition walls 106 to eject the ink.

Figure 14:
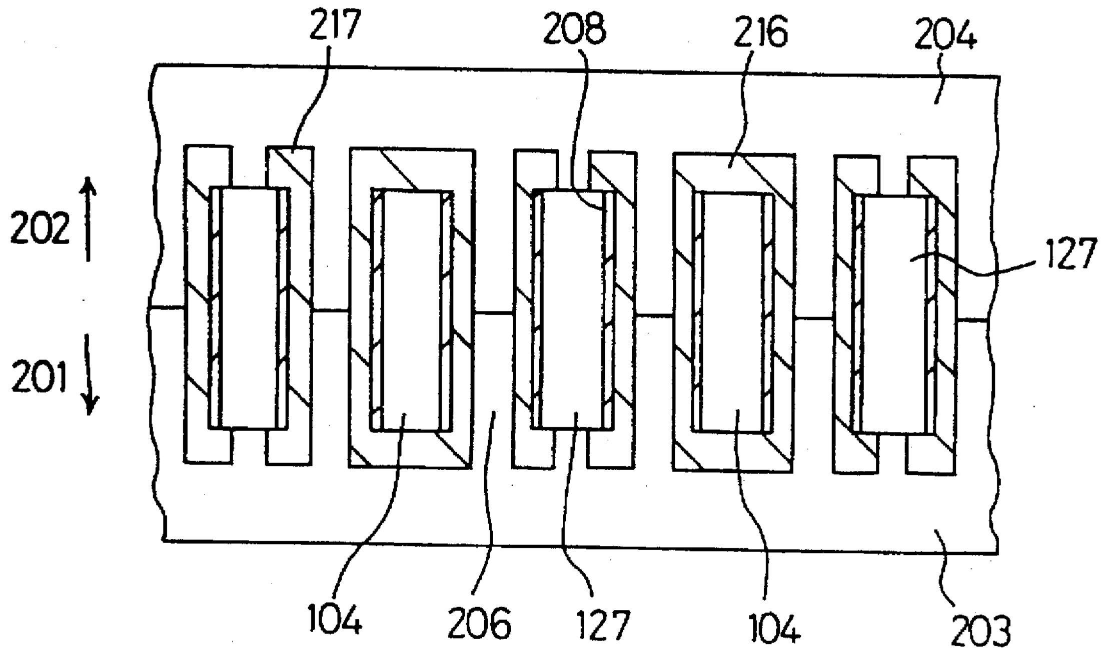
FIG. 14 is a plan showing the end face of a second preferred embodiment of the ink ejection print head according to this invention.

However, in a second preferred embodiment of the ink ejection print head 100, as shown in FIG. 14, the lower half areas in the height direction of the partition walls 206 are formed in a piezoelectric ceramic plate 203 which are polarized in a direction indicated by an arrow 201. The upper half areas are formed of a piezoelectric ceramic plate 204 which is polarized in the direction indicated by an arrow 222, which is opposite to the polarizing direction indicated by the arrow 201. Metal electrodes 208 are formed on the whole surfaces of the partition walls 206. The ink is ejected by the piezoelectric deformation of both the upper half and lower half areas of the partition walls 206. With this construction, a smaller voltage may be applied to the partition walls.

In these preferred embodiments, the metal electrodes of the air channels 127 and the ink non-ejection channels 104 are grounded, and the voltage is applied to the metal electrodes 108 of the ink ejection channels 104. However, as shown in FIG. 14, metal electrodes 216, each connected to both the metal electrodes 208 in each ink channel 104, and metal electrodes 217, each connected to the metal electrode 208 at one side of each air channel 127, are formed on one end surface of each of the piezoelectric ceramic plates 203 and 204.

Figure 15:
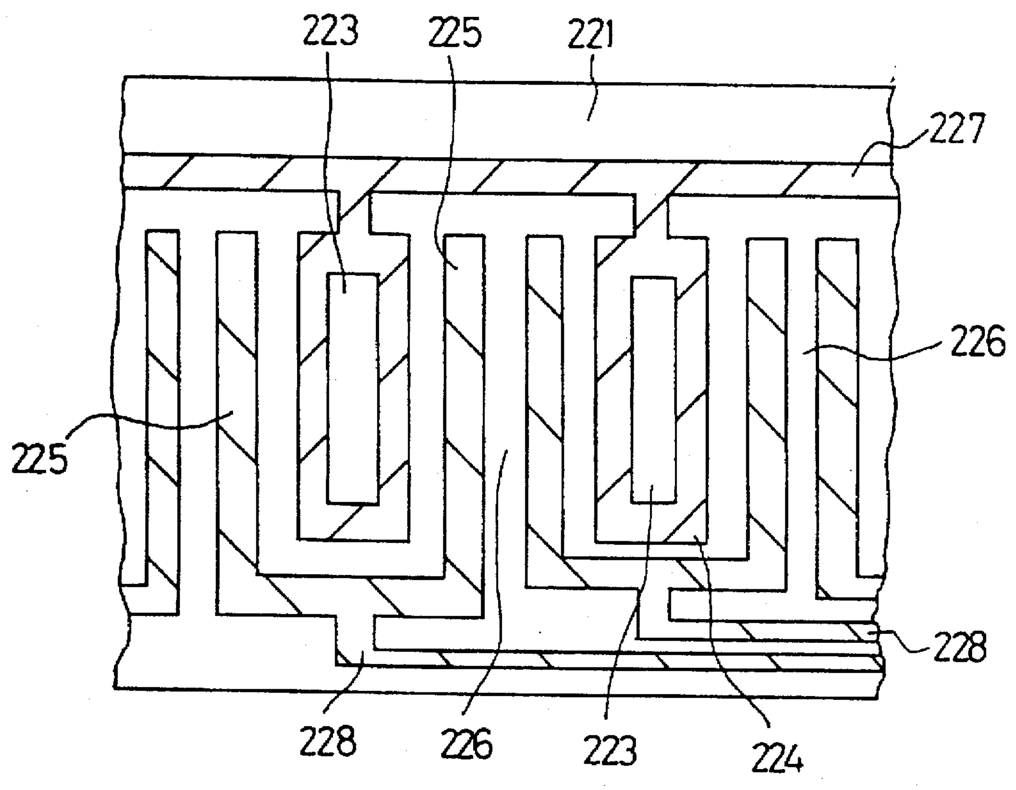
FIG. 15 is a plan view of a third preferred embodiment of the flexible print board.

Further, as shown in FIG. 15, a flexible print board 221 is provided with ink supply ports 223 corresponding to the ink channels 104, contact electrodes 224 corresponding to the metal electrodes 216, contact electrodes 225 corresponding to the metal electrodes 217, cover portions 226 for covering the air channels 127, a connection pattern 227 for connecting all of the contact electrodes 224 to the LSI chip 51, and connection patterns 228, each of which is connected to each pair of contact electrodes 225 between which each contact electrode 224 is sandwiched, to connect each pair of contact electrodes 225 to the LSI chip 51.

When the flexible print board 221 is adhesively attached to the piezoelectric ceramic plates 203 and 204, as shown in FIG. 11, each ink supply port 223 connects to one ink channel 104. The cover portions 226 close the air channels 127 to prevent the ink from leaking into the air channels 127. The contact electrodes 224 are electrically connected to the metal electrodes 216. The contact electrodes 225 are electrically connected to the metal electrodes 217. The LSI chip 51 applies a voltage V through the contact electrodes 225 and the connection patterns 228 to the contact electrodes 108 in the air channels 127 on both sides of the partition walls 206 which define the interleaved ejection ink channel 104. The LSI chip 51 also connects the ground line 55 to the other metal electrodes 208 of the air channels 127 through the contact electrodes 225 and the connection patterns 228. In addition, the LSI chip 51 connects the ground line 55 to the metal electrodes 208 in the ink channels 104 through the contact electrodes 224 and the connection pattern 227.

At this time, an electric field is generated in both partition walls 206 of the ink ejection channel 104. The partition walls 206 move away from each other. When the voltage is removed, the partition walls return to their original state. Thus, no voltage is applied to the metal electrodes 208 in the ink channels 104. Therefore, it is unnecessary to provide the protection film 177 for protecting the metal electrodes 108 from the ink, as shown in FIG. 7. Therefore, the manufacturing cost can be reduced.

Figure 16:
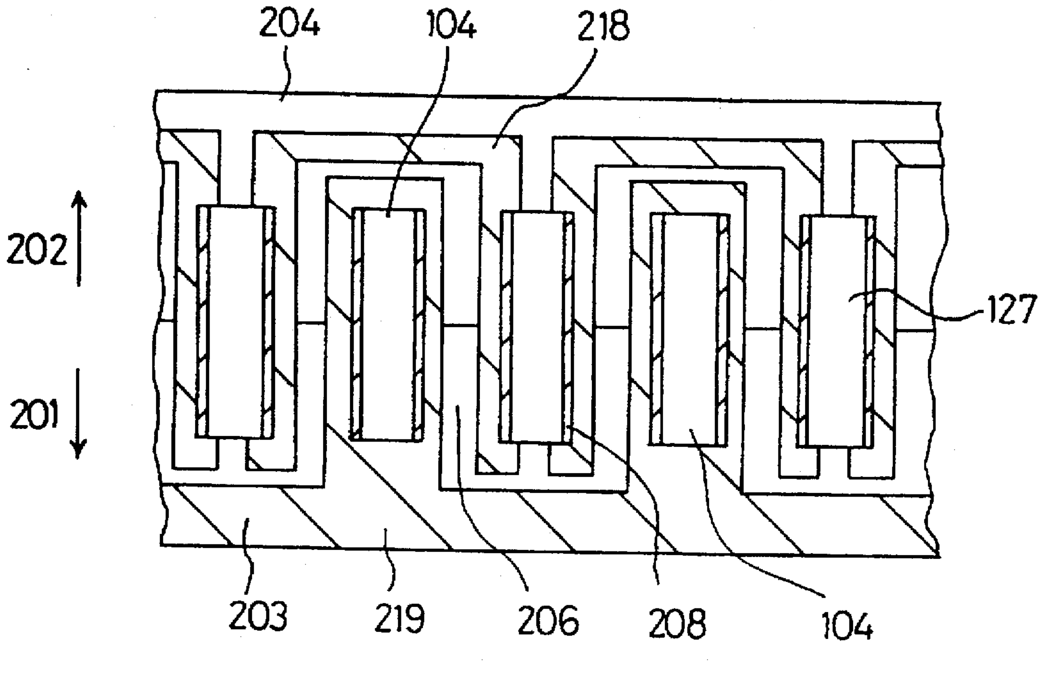
FIG. 16 is a plan view showing the end face of a third preferred embodiment of the ink ejection print head according to this invention.

In the second preferred embodiment of the ink ejection print head 100 shown in FIG. 14, each metal electrode 217 is connected to only one of the metal electrodes 108 in an air channel 127. However, in a third preferred embodiment of the ink ejection print head 100, a metal electrode 218 may be provided for connecting the two metal electrodes 217 which are directly adjacent to the same channel 104, as shown in FIG. 16. In this case, the gap between the adjacent contact electrodes on the flexible print board can be increased. Thus adjacent contact electrodes are prevented from becoming shortcircuited.

Furthermore, when a metal electrode 219 for connecting all the metal electrodes 208 in the ink channels 104 is provided, the number of contact points with the flexible print board can be reduced, and the connection work can be facilitated. In this third preferred embodiment of the ink ejection print head 100, the metal electrodes 116 and 117 which are connected to the metal electrodes 108 in the ink channels 104 and the air channels 127 are connected to the contact electrodes 142 and 145 of the flexible print board 141 on the end surface 102B of the piezoelectric ceramic plate 102.

Figure 17:
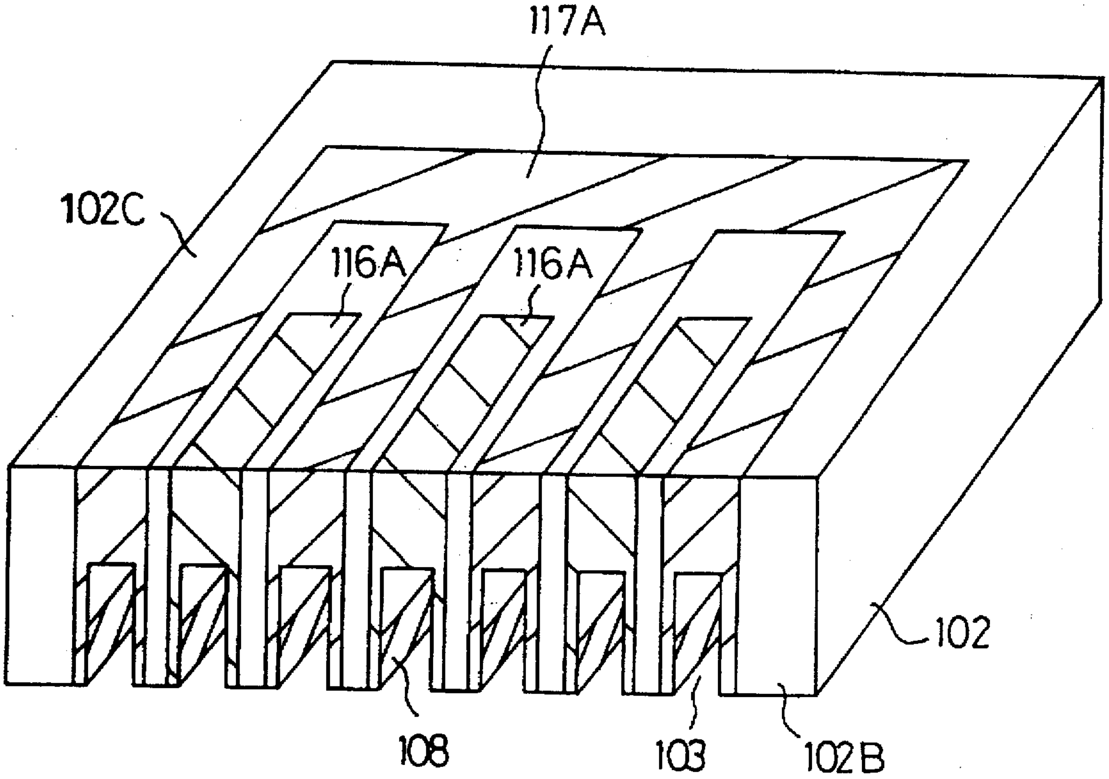
FIG. 17 is a perspective view of a fourth preferred embodiment of the ink ejection print head according to this invention.
Figure 18:
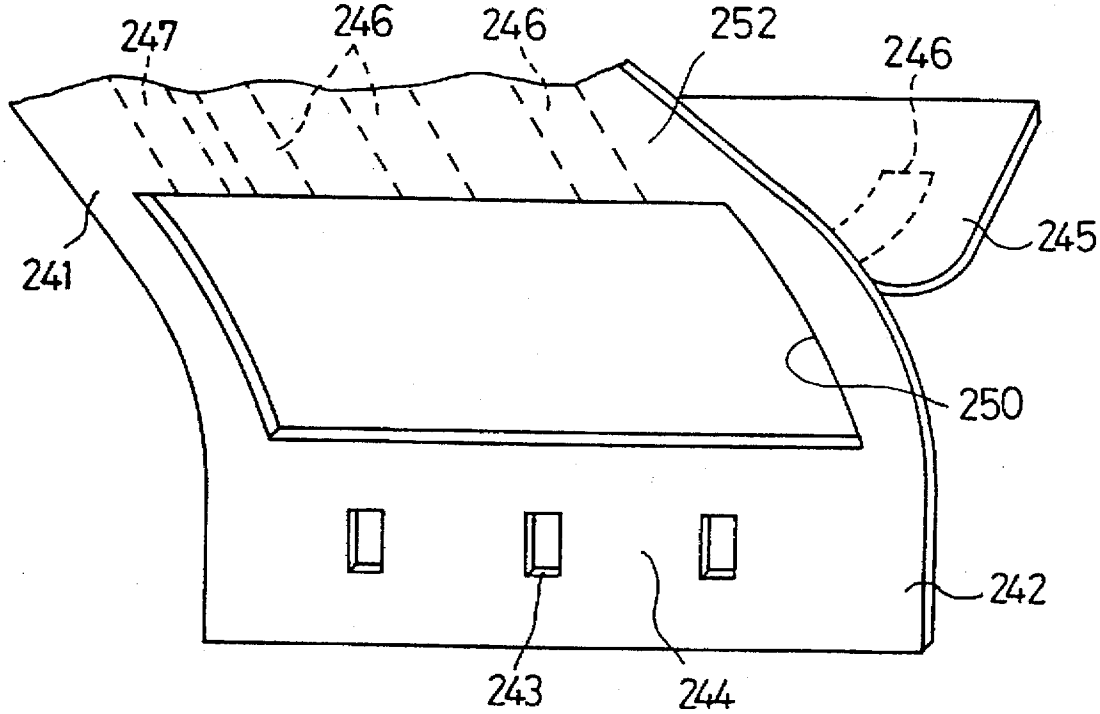
FIG. 18 is a perspective view of a flexible print board which is connected to the fourth preferred embodiment of the ink ejection print head.
Figure 19A:
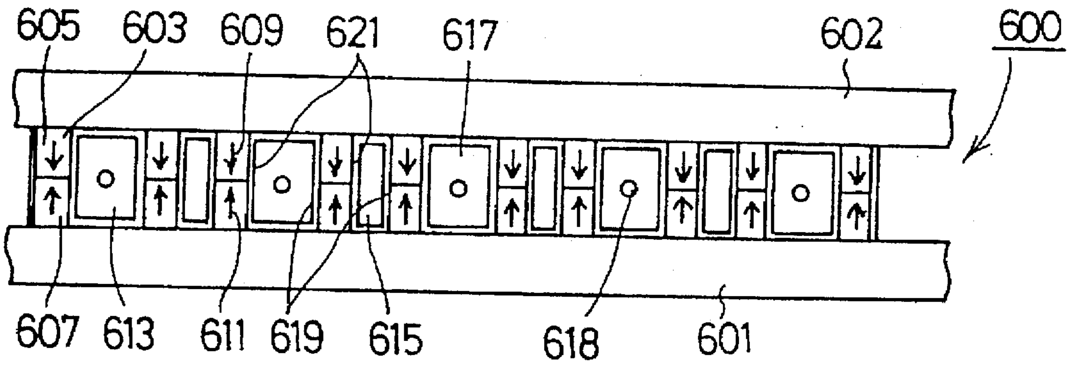
Fig.19 A RELATED ART
FIG. 19A is an end plan view of conventional ink ejecting device.
Figure 19B:
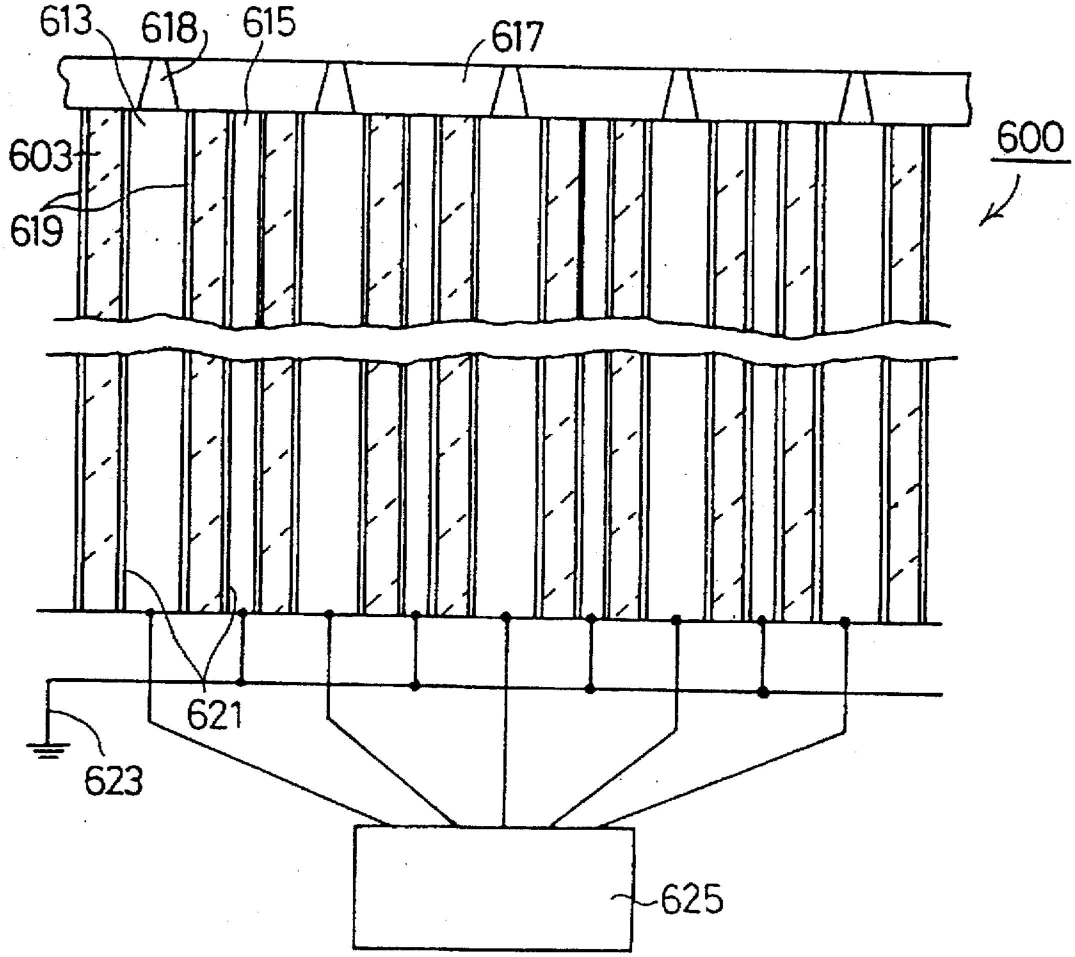
Fig.19 B RELATED ART
FIG. 19B is a top plan view of the conventional ink ejecting device.

However, in a fourth preferred embodiment of the ink ejection print head 100, as shown in FIG. 17, the metal electrodes 116A and 117A which are connected to the metal electrodes 108 in the ink channels 104 and the air channels 127 may be formed on a bottom surface 102C of the piezoelectric ceramic plate 102. In this case, as shown in FIG. 18, a flexible print board 241 is divided into a seal portion 242 and a connection portion 245. The seal portion 242 is adhesively attached to the end surface 102B. The connection portion 245 is adhesively attached to the bottom surface 102C.

The seal portion 242 is also provided with ink supply ports 243, each corresponding to one ink channel 104, and cover portions 244 for covering the air channels 127. The connection portion 245 is provided with contact electrodes 246, each corresponding to one metal electrode 116A and a contact electrode 247 corresponding to the metal electrode 117A. The flexible print board 241 is provided with a cut-out portion 250, as shown in FIG. 18.

If the flexible print board 241 at the cut-out portion 250 is tucked in, a chip connection portion 252 which is used to connect the flexible print board 241 to the LSI chip 51 can be formed, without bending the contact electrodes 246 and 247. The contact electrodes 246 and 247, except for the portions which contact the metal electrodes 116A and 117A, are coated. With this construction, the gap between the respective contact electrodes 246 and 247 on the flexible print board 241 can be increased. Thus, shortcircuits between the contact electrodes 246 and 247 are prevented and the connection work is facilitated.

Furthermore, in these preferred embodiments of the ink ejection print head 100, the grooves 103 are formed on one surface of the piezoelectric ceramic plate 102. However, the piezoelectric ceramic plate may be designed to have a large thickness, so that the grooves 103 can be formed on both the top and bottom surfaces 102D and 102C of the piezoelectric ceramic plate 102 to form two arrays of ink channels.

Still furthermore, in these preferred embodiments, only one piezoelectric ceramic plate 102 is used. However, plural piezoelectric ceramic plates 102 may be laminated together While this invention has been described in conjunction with the specific embodiments outlined above, it is evident that many alternative, modification and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An ink ejecting device, comprising:

a first plate and a second plate, at least one of the first and second plates having a plurality of grooves and interleaved partition walls, the first and second plates attached together and covering the grooves to form a plurality of interleaved ink ejection channels and air channels;

an ink supply member attached to at least one of the first plate and the second plate and supplying ink to the plurality of ink ejection channels;

a plurality of first electrodes formed on sides of the plurality of partition walls forming one of the plurality of ink ejection channels and the plurality of air channels;

a plurality of second electrodes formed on sides of the plurality of partition walls forming the other of the plurality of air channels and the plurality of ink ejection channels; and a link member, comprising:

a plurality of first connection portions, each connecting at least one of the plurality of first electrodes to a power source circuit, at least one second connection portion for connecting the plurality of second electrodes to the power source circuit, a plurality of ink supply ports connecting the plurality of ink ejection channels to the ink supply member, and a plurality of cover portions covering the plurality of air channels to prevent ink from the ink supply member from entering the air channels.

2. The ink ejecting device of claim 1, wherein the link member comprises a flexible print board.

3. The ink ejecting device of claim 1, further comprising:

a plurality of third electrodes provided on an outside surface of at least one of the first plate and the second plate, each of the plurality of third electrodes connected to at least one of the plurality of first electrodes; and a fourth electrode provided on the outside surface of the at least one of the first plate and the second plate and connected to each of the plurality of second electrodes.

4. The ink ejecting device of claim 3, wherein the outside surface of the at least one of the first plate and the second plate on which the plurality of third electrodes and the fourth electrode are formed and an outside surface of at least one of the first plate and the second plate through which ink is supplied to the plurality of ink ejection channels is the same surface.

5. The ink ejecting device of claim 3, wherein ink is supplied to the plurality of ink ejection channels through a first outside surface of at least one of the first plate and the second plate and the plurality of third electrodes and the fourth electrode are formed on the first outside surface of the at least one of the first plate and the second plate and a second outside surface of at least one of the first plate and the second plate.

6. The ink ejecting device of claim 3, wherein each one of the plurality of third electrodes is connected to two first electrodes.

7. The ink ejecting device of claim 6, wherein the plurality of first electrodes comprise electrodes formed on the side walls of the plurality of ink ejection channels, and each of the plurality of third electrodes is connected to the first electrodes of the same ink ejection channel.

8. The ink ejecting device of claim 6, wherein the plurality of first electrodes comprise electrodes formed on the side walls of the plurality of air channels, and each of the plurality of third electrodes is connected to first electrodes adjacent to the same ink ejection channel.

9. The ink ejecting device of claim 3, wherein:

each of the plurality of first connection portions connects one of the plurality of third electrodes to the power source circuit; and the at least one second connection portion connects the fourth electrode to the power source circuit.

10. The ink ejecting device of claim 9, wherein each of the plurality of first connection portions comprises a contact electrode contacting a corresponding one of the third electrodes and a connection pattern connecting the contact electrode to the power source circuit.

11. The ink ejecting device of claim 9, wherein the at least one second connection portion comprises a contact electrode contacting the fourth electrode and a connection pattern connecting the contact electrode to the power source circuit.

12. The ink ejecting device of claim 1, wherein each of the at least one second connection portion and the plurality of first connection portions comprises:

a first thin layer of a conductive material formed on the link member, and a second thin layer of a conductive low melting point material formed on the first thin layer, wherein the melting point of the second thin layer is lower than a melting point of the first thin layer.

13. The ink ejecting device of claim 12, wherein, when the ink ejecting device is heated to a temperature between the melting point of the first thin layer and the melting point of the second thin layer, the second thin layer melts to mechanically connect the link member to at least the first plate and to electrically connect each of the plurality of first connection portions and the at least one second connection portion to the corresponding ones of the plurality of first electrodes and the plurality of second electrodes.

14. The ink ejecting device of claim 1, wherein each of the at least one second connection portion and the plurality of first connection portions comprises:

a first thin layer of a conductive material formed on the link member, and a second thin layer of a conductive adhesive material formed on the first thin layer.

15. The ink ejecting device of claim 14, wherein the second thin layer comprises a mixture of an epoxy adhesive and a metal powder.

16. The ink ejecting device of claim 1, further comprising an adhesive layer provided on the link member in areas separate from the plurality of first connection portions, the at least one second connection portion and the plurality of ink supply ports to mechanically connect the link member to at least one of the first plate, the second plate and the ink supply member.

17. The ink ejecting device of claim 1, wherein the plurality of first electrodes comprise electrodes formed on the side walls of the plurality of air channels and the plurality of second electrodes comprise electrodes formed on the side walls of the plurality of ink ejection channels, the ink ejecting device further comprising:

a plurality of third electrodes provided on an outside surface of at least one of the first plate and the second plate, each of the plurality of third electrodes connected to a pair of the plurality of first electrodes which are adjacent to the same ink ejection channel; and a plurality of fourth electrodes provided on the outside surface of the at least one of the first plate and the second plate, each of the plurality of fourth electrodes connected to the second electrodes of the same ink ejection channel.

18. The ink ejecting device of claim 17, wherein:

each of the plurality of first connection portions is partially positioned within a corresponding cover portion and connects one of the plurality of third electrodes to a power source circuit; and the at least one second connection portion connects the plurality of fourth electrodes to the power source circuit.

19. The ink ejecting device of claim 1, wherein the first plate is a substrate and the second plate is a cover plate, the plurality of grooves and the plurality of partition walls formed in the substrate.

20. The ink ejecting device of claim 1, wherein the first plate is a first substrate and the second plate is a second substrate, wherein the plurality of grooves and the plurality of partition walls are formed in each of the first and second substrates.

21. The ink ejecting device of claim 1, wherein at least a portion of at least one of the first and second plates is formed of a piezoelectric material.

22. The ink ejecting device of claim 1, wherein the link member comprises a pair of flexible print boards, a first one of the pair of flexible print boards connected to an ink supply end of the first and second plates and comprising:

a plurality of the cover portions covering the plurality of air channels to prevent ink from the ink supply source from entering the air channels, and the plurality of ink supply ports connecting the plurality of ink ejection channels to the ink supply member; and a second one of the pair of flexible print boards connected to a nozzle end of the first and second plates and comprising:

a plurality of the cover portions covering the plurality of air channels, and a plurality of ink ejection nozzles, each of the nozzles connected to one of the plurality of ink channels;

wherein one of the first and second flexible print boards includes the plurality of first connection portions and the other of the first and second flexible print boards includes the at least one second connection portion.

23. The ink ejecting device of claim 1, wherein the at least one second connection portion for connecting the plurality of second electrodes to the power source circuit comprises a plurality of second connection portions, each connecting at least one of the plurality of second electrodes to the power source circuit.

24. The ink ejecting device of claim 1, wherein the at least one second connection portion comprises a plurality of contact electrodes, each contact electrode positioned within a corresponding one of the plurality of cover portions and contacting at least one corresponding second electrode, and a connection pattern connecting the plurality of contact electrodes to the power source circuit.

25. The ink ejecting device of claim 1, wherein an adhesive is provided over at least one of the plurality of cover portions between the link member and at least one of the first and second plates.

* * * * *